United States Patent [19]

Shimizu et al.

[11] Patent Number: 5,521,821
[45] Date of Patent: May 28, 1996

[54] SUSPENSION CONTROL SYSTEM FOR AUTOMOTIVE VEHICLE

[75] Inventors: Hiroyuki Shimizu; Toru Takahashi; Makoto Kimura, all of Kanagawa, Japan

[73] Assignee: Atsugi Unisia Corp., Japan

[21] Appl. No.: 283,677

[22] Filed: Aug. 1, 1994

Related U.S. Application Data

[63] Continuation of Ser. No. 956,079, Oct. 2, 1992, abandoned.

[30] Foreign Application Priority Data

Oct. 3, 1991 [JP] Japan ................................. 3-256575

[51] Int. Cl.⁶ .............................. G06F 7/70; G06G 7/76; B60G 11/26; B60G 21/00
[52] U.S. Cl. ................... 364/424.05; 364/424.01; 280/703; 280/707; 280/714; 188/299; 188/319; 310/68 R
[58] Field of Search .................. 364/424.05, 424.01, 364/426.01, 426.02; 280/703, 707, 714, 724; 188/299, 319; 310/68 R

[56] References Cited

U.S. PATENT DOCUMENTS

| | | | |
|---|---|---|---|
| 3,770,292 | 11/1973 | Palazzetti | 280/124 F |
| 4,789,935 | 12/1988 | Buma et al. | 364/424.05 |
| 4,804,203 | 2/1989 | Glab et al. | 280/707 |
| 4,838,574 | 6/1989 | Baraszu | 280/707 |
| 4,887,699 | 12/1989 | Ivers et al. | 188/378 |
| 4,936,425 | 6/1990 | Boone et al. | 280/707 |
| 5,062,657 | 11/1991 | Mayeed | 280/707 |
| 5,072,965 | 12/1991 | Wada et al. | 364/424.05 |
| 5,090,728 | 2/1992 | Yokoya et al. | 364/424.05 |
| 5,097,419 | 3/1992 | Lizell | 364/424.05 |
| 5,160,162 | 11/1992 | Mouri et al. | 280/707 |
| 5,162,996 | 11/1992 | Matsumoto et al. | 364/424.05 |
| 5,231,583 | 7/1993 | Lizell | 364/424.05 |
| 5,310,027 | 5/1994 | Nakamura et al. | 280/707 |
| 5,338,058 | 8/1994 | Ohtagaki et al. | 364/424.05 |
| 5,365,432 | 11/1994 | Kakizaki et al. | 364/424.05 |

FOREIGN PATENT DOCUMENTS

| | | |
|---|---|---|
| 3925102A1 | 2/1990 | Germany. |
| 4011732A1 | 10/1990 | Germany. |
| 61-163011 | 7/1986 | Japan. |

*Primary Examiner*—Kevin J. Teska
*Assistant Examiner*—Jacques H. Louis-Jacques
*Attorney, Agent, or Firm*—Ronald P. Kananen

[57] ABSTRACT

A suspension control system for an automotive vehicle is provided in which a movement of a sprung mass velocity is monitored, when the magnitude of the sprung mass velocity is below a predetermined threshold value, a control unit outputs a control signal to a pulse motor to vary the position of an adjuster so that one of extension and compression stroke sides of a position member of a shock absorber, whose direction is the same as that of the sprung mass velocity provides a high damping coefficient, and when the magnitude of the sprung mass velocity is above the predetermined threshold value, a control constant for the damping coefficient is changed toward a high damping sensitivity range until the sprung mass velocity exceeding the predetermined threshold value is reduced below another predetermined threshold value, a magnitude of the other predetermined threshold value being lower than that of the predetermined threshold value.

11 Claims, 9 Drawing Sheets

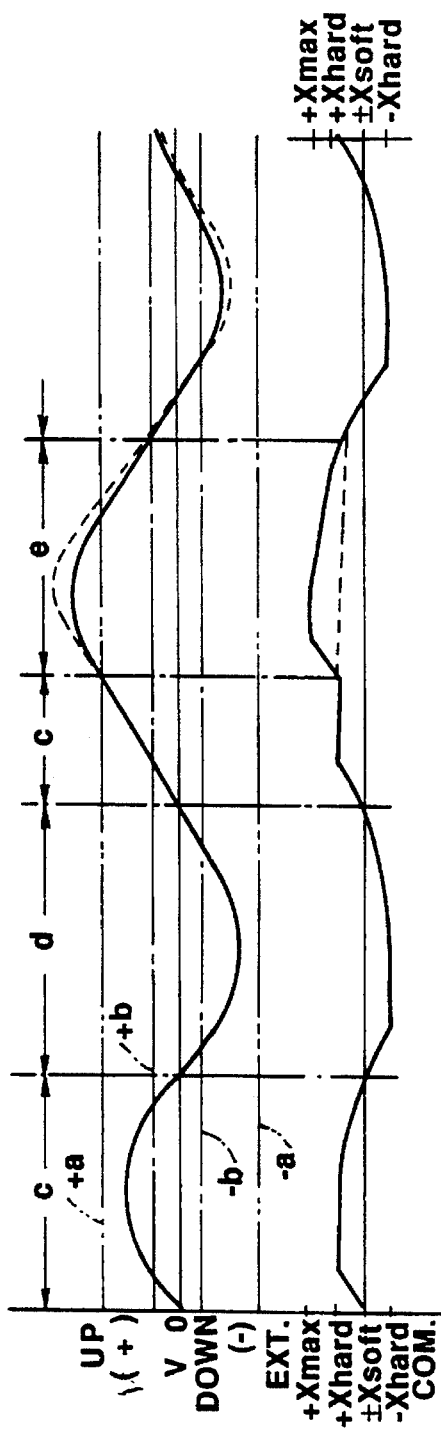
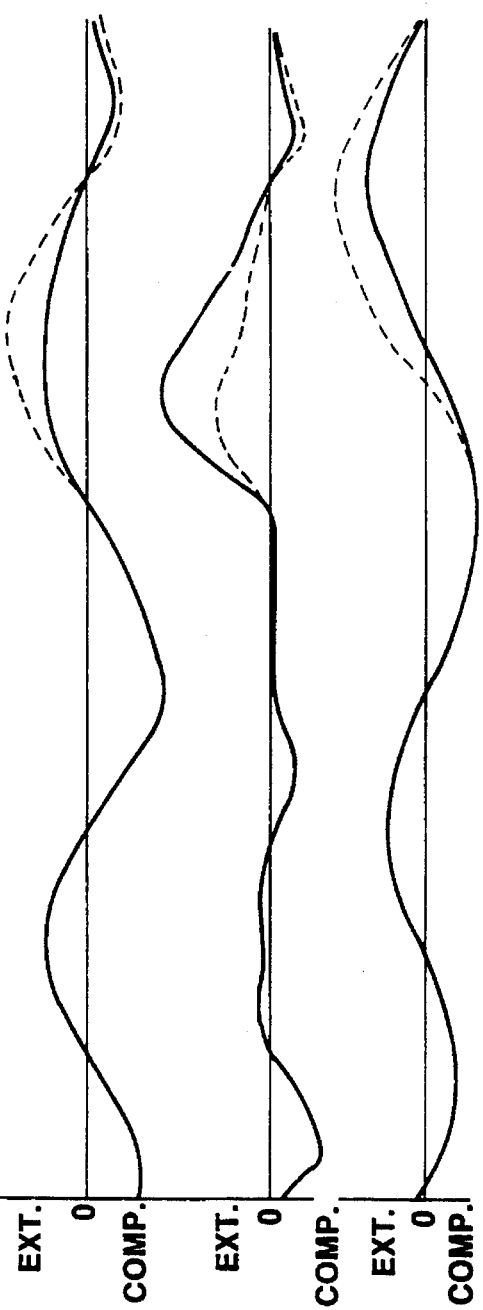

1

SUSPENSION CONTROL SYSTEM FOR AUTOMOTIVE VEHICLE

This application is a continuation of application Ser. No. 07/956,079 filed Oct. 2, 1992, now abandoned.

BACKGROUND OF THE INVENTION

1. Field of the Invention

The present invention relates generally to a system and method for controlling a damping coefficient of a shock absorber (also called a damper, but hereinafter referred to as the shock absorber) interposed between an unsprung mass and sprung mass of the vehicle. The shock absorber is provided with changing means for changing the damping coefficient thereof at multiple stages in response to a control signal.

2. Description of the Background Art

A Japanese Patent Application First Publication No. Showa 61-163011 published on Jul. 23, 1986 exemplifies a previously proposed electronically controlled shock absorber.

In the previously proposed electronically controlled shock absorber, a sprung mass velocity and a relative velocity between the sprung mass and unsprung mass are derived. Then, when a direction of the sprung mass velocity (upward is plus + and downward is minus −) is coincident with a direction of the relative velocity described above (an extension stroke side is + and a constriction (compression) stroke side is −), the shock absorber is controlled so as to provide a relatively high damping coefficient. On the contrary, when both of the directions described above are not coincident with each other, the shock absorber is controlled so as to provide a relatively low damping coefficient.

However, in a case where a large input magnitude from a road surface on which the vehicle runs occurs, a stroke quantity of the shock absorber at the extension stroke side becomes remarkably increased. When the extension stroke side of the shock absorber is reached to an extension stroke limit, the direction of the sprung mass velocity is upward (+) and the direction of the relative velocity between the unsprung mass and sprung mass is toward the extension stroke limit (−). Therefore, since both directions are not coincident with each other, the damping coefficient of the shock absorber is controlled to provide the relatively low damping coefficient. Consequently, the shock absorber extends toward the extension stroke limit and generates an abnormal sound and vibrations thereat.

SUMMARY OF THE INVENTION

It is, therefore, a principal object of the present invention to provide an improved suspension control system for an automotive vehicle which can prevent generation of the abnormal sound and/or generation of the vibration or fluctuation due to the shock absorber reaching the extension stroke limit.

The above-described object can be achieved by providing a suspension control system for an automotive vehicle, comprising: a) at least one shock absorber, interposed between sprung mass and unsprung mass of the vehicle, having a piston member and a damping coefficient varying means therein, said damping coefficient varying means operatively changing its position in response to a control signal so that a damping coefficient of at least one of both extension and compression stroke sides of the piston member is set to a target damping coefficient; b) detecting means for detecting an sprung mass velocity of the vehicle and producing a sprung mass velocity signal indicative thereof; c) setting means for previously setting a first threshold value for the sprung mass velocity and a second threshold value therefor, said second threshold value being lower than the first threshold value; d) monitoring means for monitoring a movement of the sprung mass velocity signal with respect to first and second threshold values, the magnitude of said second threshold value being lower than that of said first threshold value; and e) control means for outputting the control signal to said damping coefficient varying means so that the damping coefficient at one of the stroke sides whose direction is the same as that of the sprung mass velocity is set to a predetermined high damping coefficient as the target damping coefficient when the magnitude of the detected sprung mass velocity is below the first threshold value, said control means having a control constant changing block for changing a control constant for the damping coefficient toward a higher damping sensitivity range until the sprung mass velocity is reduced below the second threshold value, when the magnitude of the sprung mass velocity is above the first threshold value.

BRIEF DESCRIPTION OF THE DRAWINGS:

FIGS. 13(A) through 13(E) are characteristic graphs of sprung mass velocity V, position damping coefficient switching, extension/constriction velocity shock absorber, damping force F, and displacement shock absorber.

DESCRIPTION OF THE PREFERRED EMBODIMENT

Reference will, hereinafter, be made to the drawings in order to facilitate a better understanding of the present invention.

Figure 1:
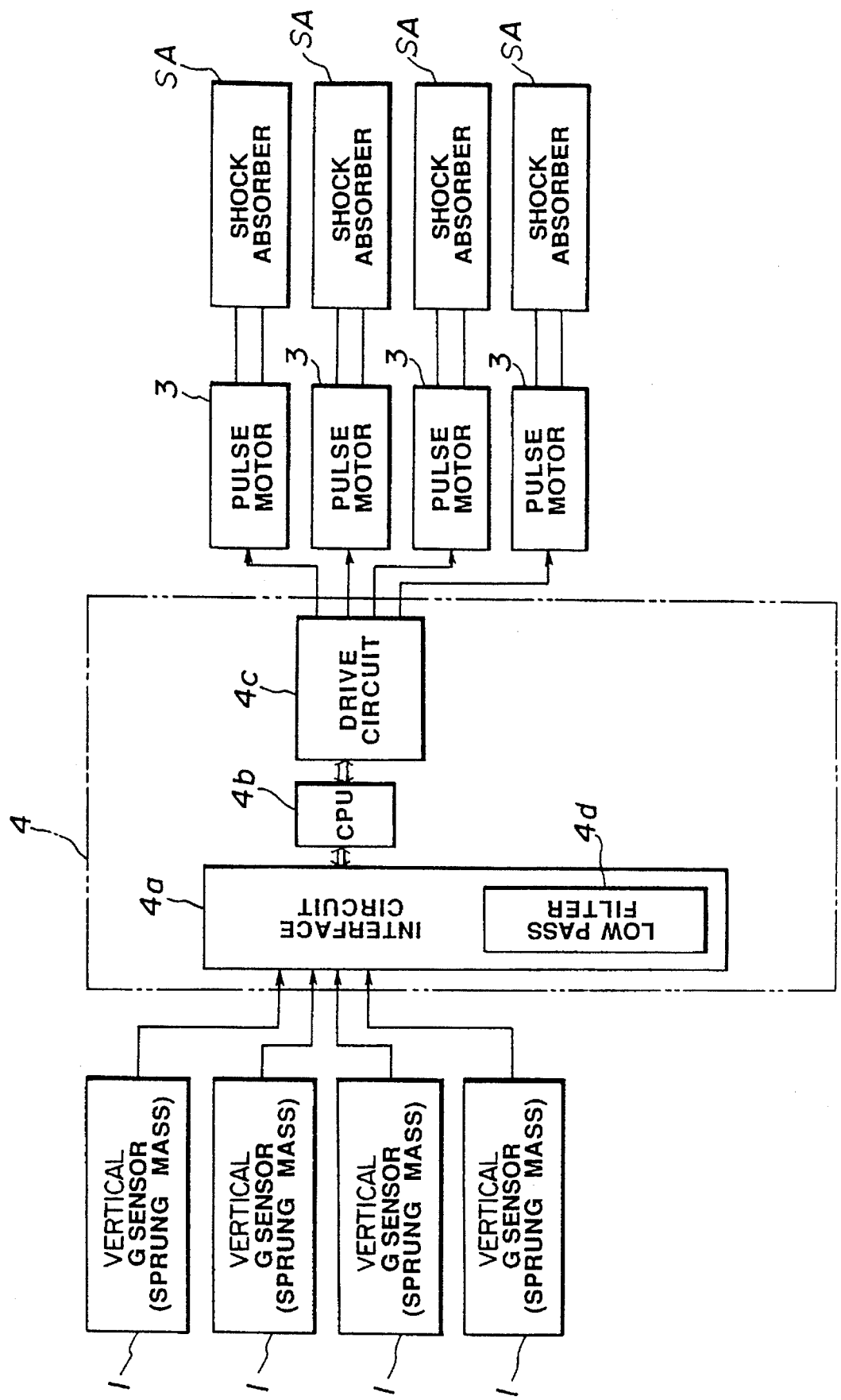
FIG. 1 is a circuit block diagram of a suspension control system for an automotive vehicle in a preferred embodiment according to the present invention.

FIG. 1 shows a circuit block diagram of a control system in a preferred embodiment according to the present invention.

In FIG. 1; each shock absorber of a damping force variable type SA is disposed between a sprung mass (vehicle body) and an unsprung mass (tire wheel). A pulse motor 3 is interposed between a control unit 4, i.e., a drive circuit 4c and corresponding shock absorber SA.

A CPU (Central Processing Unit, or alternatively microprocessor) 4b is connected between an interface circuit 4a and drive circuit 4c.

Four vertical G sensors 1 are connected to the interface circuit 4a of the control unit 4.

Each pulse motor 3 serves to change stepwise a damping coefficient position of the shock absorber at the multiple stages.

The vertical G sensors 1 are disposed on the vehicle body of the sprung mass. The longitudinal G sensors 1 detect the corresponding vertical accelerations and output electrical signals to the interface circuit 4a. Each vertical G sensor 3 is installed for each shock absorber SA.

A low pass filter 4d serves to eliminate high frequency unsprung mass vibration frequency components from the detected vertical acceleration.

In this embodiment, the low pass filter having a cut off frequency of 3 Hz is used. Therefore, the signal component having a frequency lower than the filter cut-off frequency of 3 Hz is input to the control unit 4. This is a signal representing an acceleration signal value as the sprung mass resonance frequency component.

The control unit 4, i.e., CPU 4b outputs a control signal to one corresponding pulse motor 3 on the basis of the input signal from the corresponding one of the vertical G sensors 3 and sprung mass acceleration signal passed through the low pass filter 4d so as to provide an optimum (target) damping coefficient for the corresponding shock absorber SA.

The control unit 4 has a control constant changing block which changes the control constant according to the magnitude of sprung mass velocity V.

That is to say, as shown in FIG. 1, the control unit 4 includes the interface circuit 4a, CPU 4b, and the drive circuit 4c. The interface circuit 4a receives the output signal from each vertical G sensor 3.

The low pass filter 4d is incorporated into the interface circuit 4a. The input signal from each vertical G sensor 1 is input to the CPU 4b via the low pass filter 4d.

Figure 2:
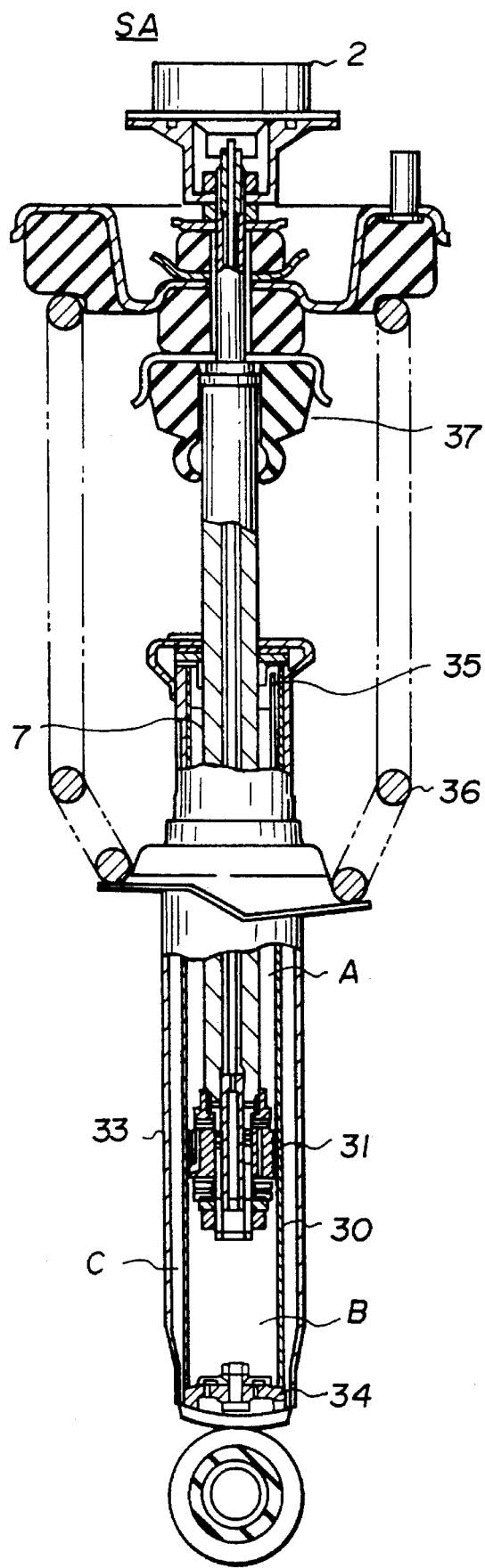
FIG. 2. is a partially cross sectional view of a shock absorber used in the preferred embodiment shown in FIG. 1.

FIG. 2 shows a partially cross sectioned view of each shock absorber SA shown in FIG. 1.

Each shock absorber SA includes: a cylinder 30, a piston 31 disposed in the cylinder 30 so as define the cylinder 30 into an upper chamber A and lower chamber B, an outer envelope 33 to form a reservoir C on an outer periphery of the cylinder 30, a base 34 defining the lower chamber B and reservoir C; a guide member 35 guiding the piston rod 7 which is associated with the piston 31; a suspension spring 36 intervened between the outer envelope 33 and vehicle body; and a bumper rubber member (or bushing) 37.

Figure 3:
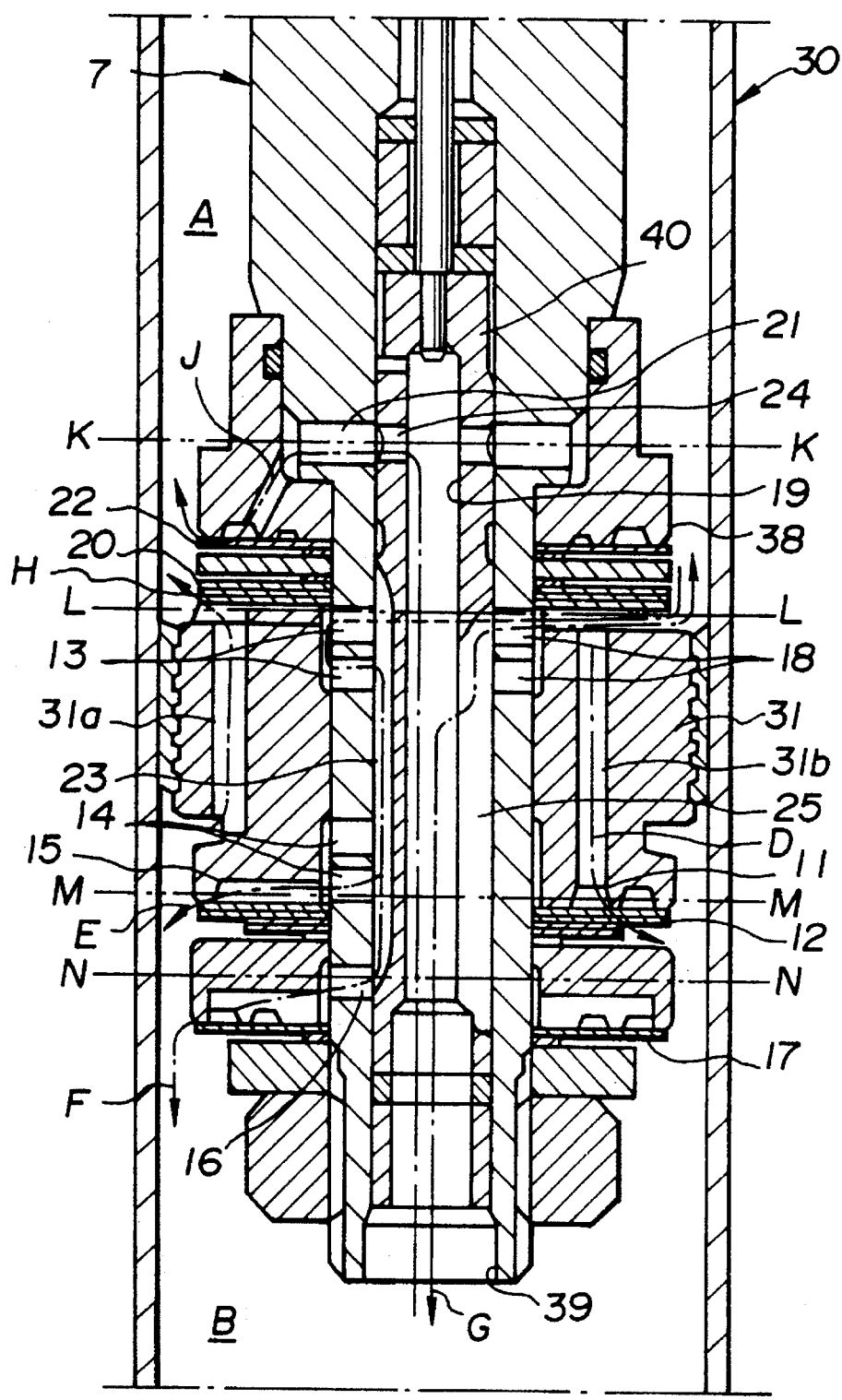
FIG. 3 is a cross sectional view of a piston member of the shock absorber shown in FIG. 2.

FIG. 3 shows an enlarged cross sectional view of the piston 31.

As shown in FIG. 3, flow passages of a fluid within the upper chamber A compressed during the extension stroke are divided into four flow passages: 1) an extension side first flow passage D from a position of an extension side internal groove 11 to the lower chamber B via an open valve portion defined by an inner side and outer peripheral side of the extension side damping valve 12; 2) an extension side second flow passage E from an extension side outer side groove 15 to the lower chamber B via an open valve defined by the outer peripheral portion of the extension stroke side damping valve 12 to a lower chamber B; 3) an extension stroke side third flow passage F from a second port 13, vertical groove 23. and fifth port 16 via a lower chamber B and via the opened extension side check valve 17; and 4) a bypass flow passage G from a third port 18, a second lateral hole 25 and hollow portion 19.

In addition, the flow passes of the fluid within the lower chamber B compressed during the compression stroke which is communicable with the upper chamber A are divided into three flow passages: 1) a compression side first flow passage H from the opened state of the compression side damping valve 20; 2) a compression side second flow passage J from the hollow portion 19, first lateral hole 24, and first port 21; and the bypass flow passage G from the hollow portion 19, second lateral hole 25, and third port 18 to the upper chamber A.

An adjuster 40 formed with the vertical groove 23 and first and second lateral holes 24, 25 can change the position of the damping coefficients at the multiple number of stages between three positions on the basis of stepwise rotations in response to the drive of the corresponding pulse motor 3.

Figure 4A:
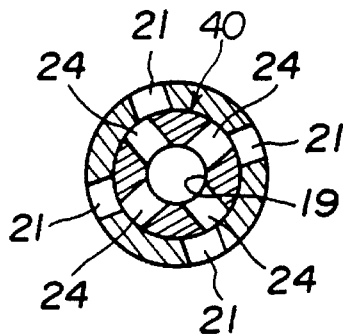
FIGS. 4(A) to 4(C), FIGS. 5(a) to 5(C), and FIGS. 6(A) to 6(C) are top views of the adjuster and communication holes for explaining the positions of the adjuster with respect to the communication hole in the shock absorber shown in FIG. 2.
Figure 4B:
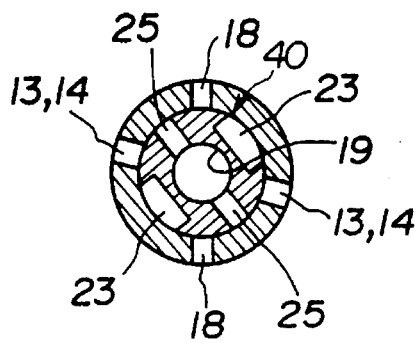
Figure 4C:
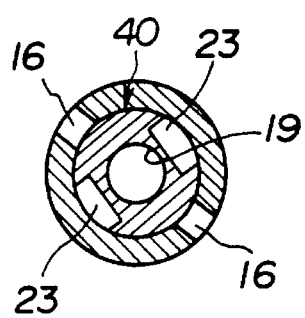

That is to say, at the second position shown in FIGS. 4 (A) through 4 (C) (position of ② in FIG. 7), all of extension side first flow passage D, compression side first flow passage H, compression side first flow passage H, and compression side second flow passage J are communicable.

Figure 7:
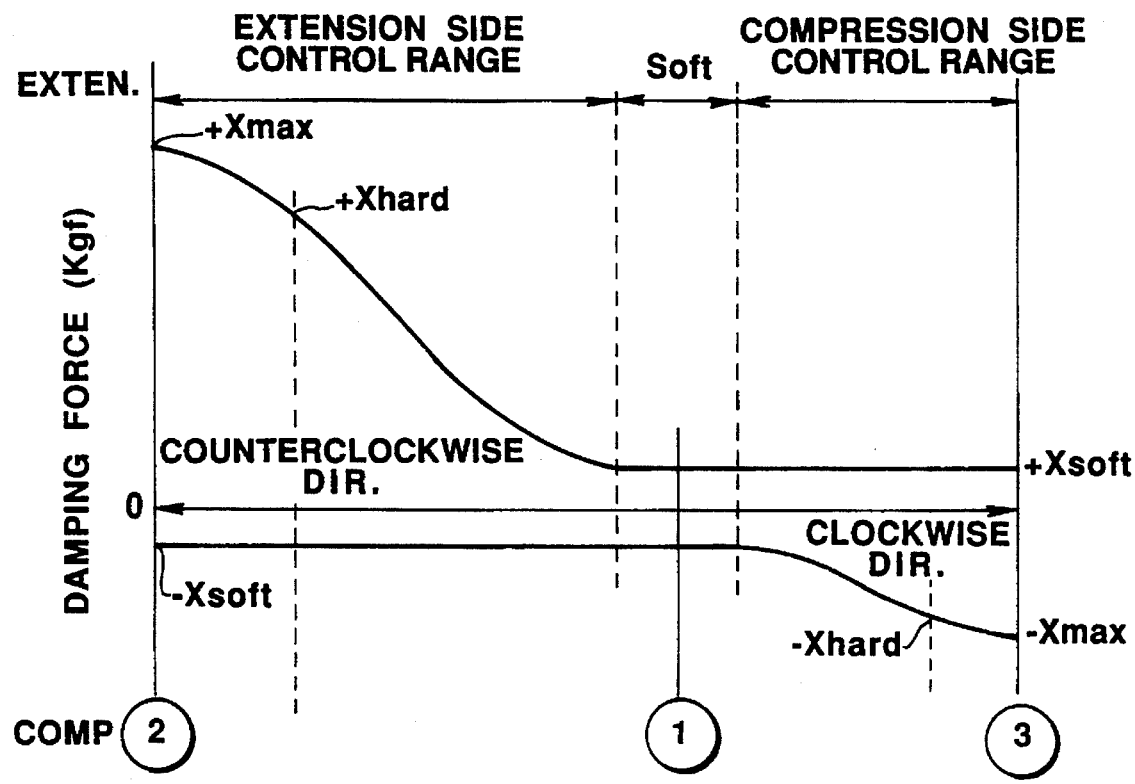
FIG. 7 is an explanatory view of a varied damping force with respect to the positions of the adjuster shown in FIGS. 4(A) to 4(C), FIGS. 5(a) to 5(C), and FIGS. 6(A) to 6(C).
Figure 11:
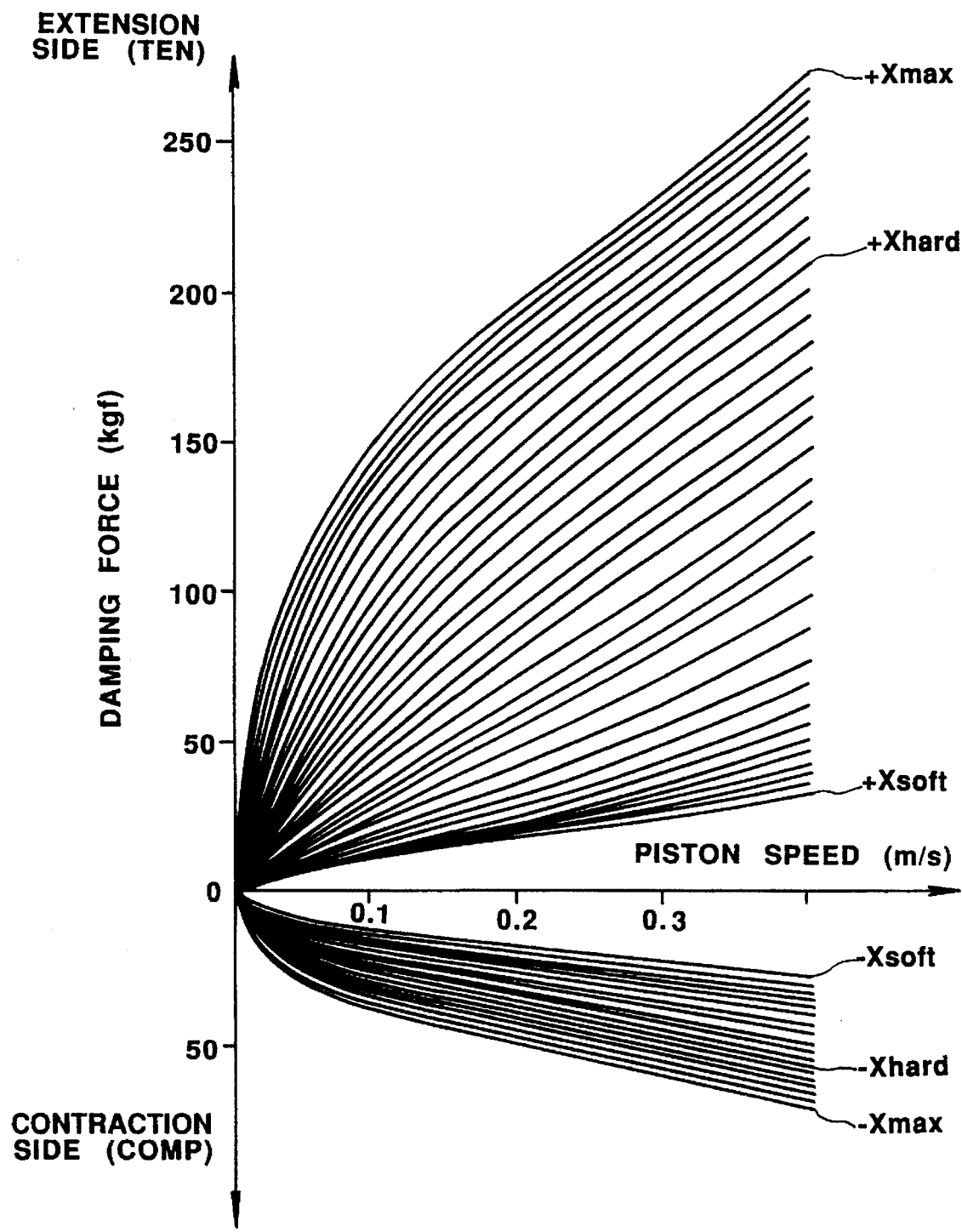
FIG. 11 is a characteristic graph of a varied damping force at each stroke side with respect to the piston velocity.

As shown in FIG. 7, the extension side provides a relatively high damping coefficient ($+X_{max}$ position of FIG. 11) and the compression side as the reverse stroke to the extension stroke provides a predetermined low damping coefficient ($+X_{soft}$ position of FIG. 11).

Figure 5A:
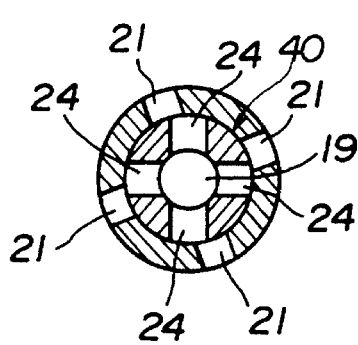
Figure 5B:
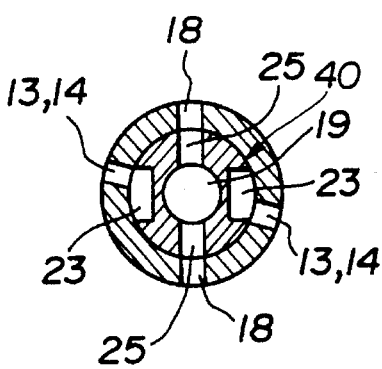
Figure 5C:
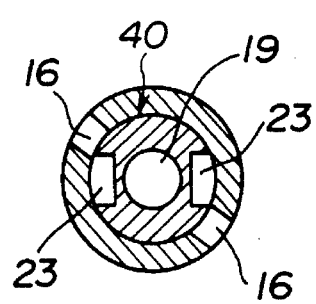
Figure 6A:
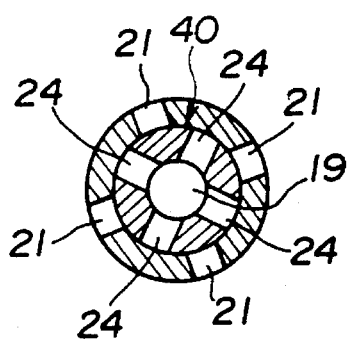
Figure 6B:
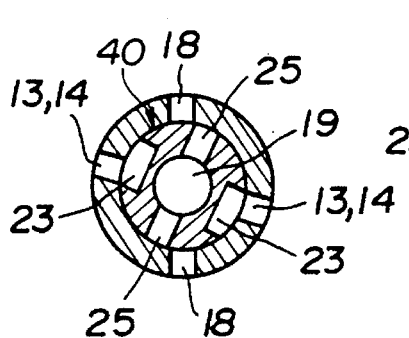
Figure 6C:
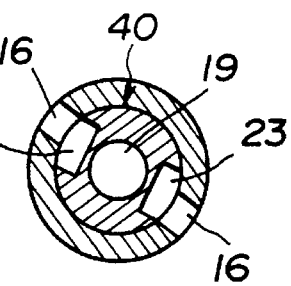

Next, at the first position shown in FIGS. 5 (A) through 5 (C) (the position of ① in FIG. 7), all of four flow passages D, E, F, and G at the compression stroke side and all of three flow passages H, J, and G at the compression stroke side are communicable.

Figure 9:
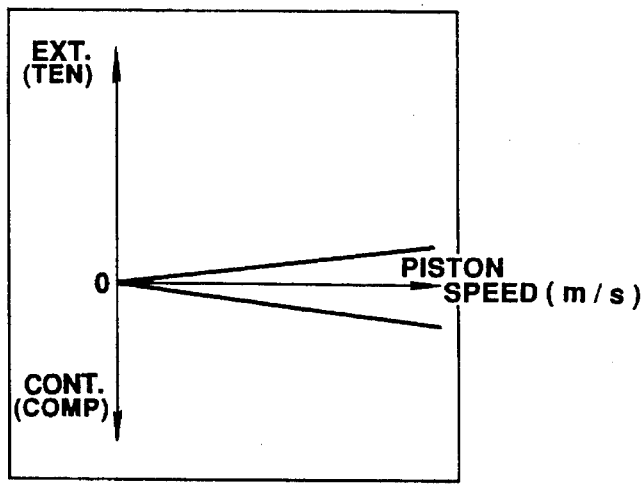

Consequently, as shown in FIG. 9, both extension and compression stroke sides provide predetermined low damping coefficients ($\pm X_{soft}$ position of FIG. 11).

Figure 10:
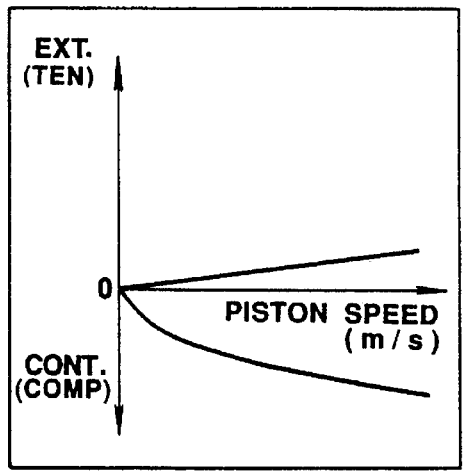

At the third position (a position of ③ in FIG. 7), the extension side first, second, and third flow passages D, E, and F and compression side first flow passage H are communicable. Thus, as shown in FIG. 10, the compression stroke side provides the relatively high damping coefficient ($-X_{max}$ position of FIG. 7) and the extension stroke side as the reversed stroke thereto, in turn, provides the relatively low damping coefficient ($-X_{soft}$ position of FIG. 11). Then, at the first and third position sides, the damping coefficient is changeable at the multiple stages according to a stepwise rotational angle of the adjuster 40. Only the damping coefficient at the high damping coefficient side is changeable in proportion to the stepwise rotational angle.

That is to say, both extension stroke and compression stroke damping coefficients of each shock absorber SA are respectively changeable at the multiple stages in response to a pivotal movement over a range from the lowest damping coefficient to the highest damping coefficient according to the characteristic shown in FIG. 11.

In addition, as shown in FIG. 7, when the adjuster 40 is pivoted toward the counterclockwise direction, starting from the position of ① (at the position of ① in FIG. 7, both compression and extension stroke sides provide low damping coefficients ($=X_{soft}$ position of FIG. 11), the damping coefficient only at the extension stroke side is changed to the higher damping coefficient side. On the contrary, when the adjuster is pivoted toward the clockwise direction, the damping coefficient only at the compression stroke is changed toward the higher damping coefficient side.

Figure 12:
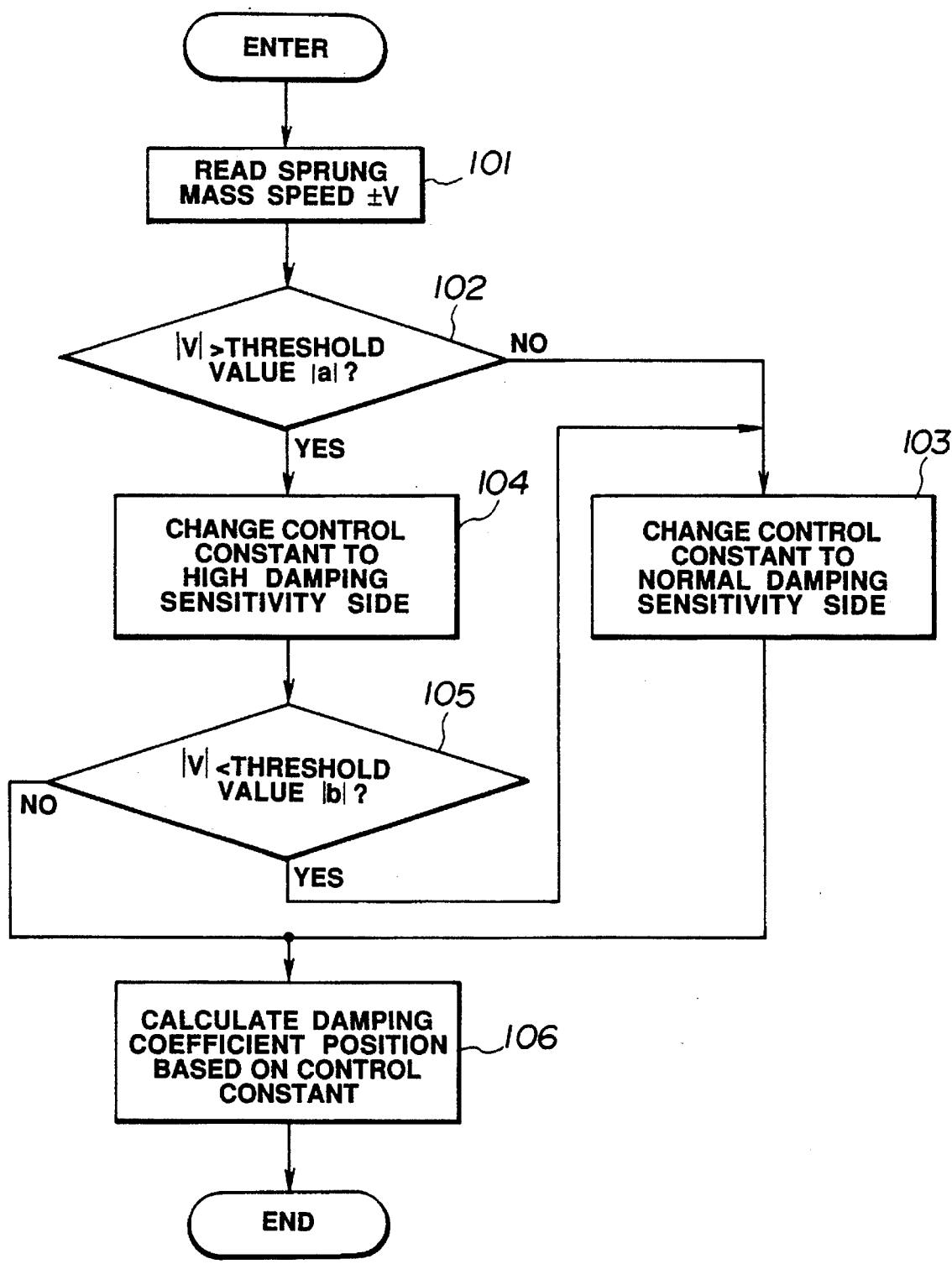
FIG. 12 is an operational flowchart executed by a control unit in the suspension control system in the preferred embodiment according to the present invention shown in FIG. 1.

Next, FIG. 12 shows an operational flowchart executed by the control unit 4 shown in FIG. 1.

First, in a step 101, after reading the sprung mass velocity ±V derived from a calculation based on the sprung mass acceleration value processed by the low-pass filter 4d, the routine goes to a step 102.

In the step 102, the CPU determines whether an absolute value |V| of the sprung mass velocity ±V exceeds an absolute value |a| of a predetermined threshold value ±a. If it is below the absolute value |a| (No), the routine goes to a step 103. If it is above the absolute value |a| (Yes), the routine goes to a step 104.

In the step 103, the control constant of the damping coefficient is switched to a normal damping coefficient sensitivity and the routine goes to a step 106. In a step 106, the damping coefficient position is calculated on the basis of the control constant providing the normal damping sensitivity. That is to say, the CPU of the control unit 4 calculates the position of the damping coefficient in proportion to the sprung mass velocity ±V with the ±$X_{hard}$ position of FIG. 10 as the maximum damping coefficient.

In the step 104, the CPU changes the control constant of the damping coefficient toward a higher damping sensitivity side than the normal damping sensitivity and the routine goes to a step 105.

In the step 105, the CPU determines whether the absolute value |V| of the sprung mass velocity ±V is reduced below the absolute value |b| of the threshold value ±b. If it is below the absolute value |b| (YES), the routine goes to the step 103. If, on the other hand, it is still above the absolute value |b|, the routine goes to a step 106. In the step 106, the CPU calculates the damping coefficient position on the basis of the control constant providing the high damping sensitivity. That is to say, the CPU calculates the damping coefficient position in proportion to the sprung mass velocity ±V with the ±$X_{max}$ position of FIG. 10 as the maximum damping coefficient.

The control unit 4 repeats the above-described flow of control. Then, the control unit 4 outputs a switching signal to the corresponding pulse motor 3 so as to change the status of the adjuster 40 toward the calculated damping coefficient position.

An operation of the preferred embodiment will be described with reference to FIGS. 13 (A) through 13 (E).

FIGS. 13 (A) through 13 (E) are timing charts for explaining operation during a run on the vehicle.

FIG. 13 (A) shows a sprung mass velocity V.

FIG. 13 (B) shows a damping coefficient switching position.

FIG. 13 (C) shows an extension/constriction (compression) speed of the shock absorber 1.

FIG. 13 (D) shows a damping force.

FIG. 13 (E) shows a stroke of the shock absorber SA.

In FIGS. 13 (A) through 13 (E), solid lines denote characteristics exhibited in the preferred embodiment and broken lines denote those exhibited when no change in the control constant occurs.

A) Small magnitude of input from a road surface;

When the absolute value |V| of the sprung mass velocity ±V calculated on the basis of the acceleration signal value derived from the sprung mass acceleration from which the higher frequency components including the unsprung mass resonance frequency are eliminated is below the absolute value |a| of the predetermined threshold value ±a, the amplitude of the extension/compression velocity of the shock absorber SA is not so large that the control constant of the damping coefficient is switched to the normal damping sensitivity side with the ±$X_{hard}$ position as a maximum limit of the damping coefficient and such a switching control as to switch the damping coefficient position to provide the high damping coefficient in proportion to the sprung mass velocity ±V for one of the stroke sides of the shock absorber SA whose direction is the same as that of the sprung mass velocity ±V.

Figure 8:
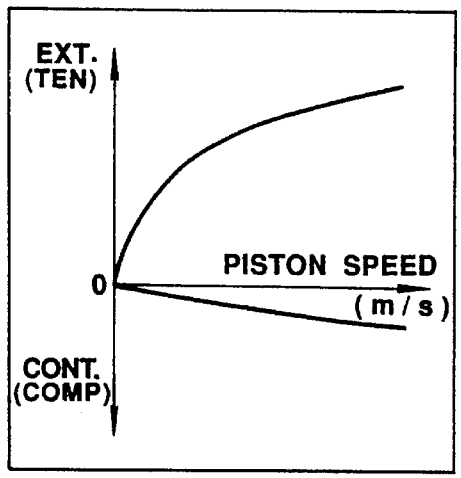
FIGS. 8, 9, and 10 are characteristic graphs of varied damping coefficients with respect to the piston velocity.

In more detail, a) as denoted by c of FIGS. 13 (A) through 13 (E), in a case where the absolute value |V| of the sprung mass velocity ±V is below the absolute value |a| of the predetermined value ±a and the direction of the sprung mass velocity V is upward (+), the adjuster position is switched to the second position (② of FIG. 7 and position of FIG. 8) so that the extension stroke side, whose direction is the same as that of the present sprung mass velocity V, provides the high damping coefficient position in proportion to the sprung mass velocity +V and the reversed compression stroke side provides the predetermined low damping coefficient (+$X_{soft}$).

b) as denoted by d of FIG. 13, when the absolute value |V| of the sprung mass velocity ±V is below the absolute value |a| of the predetermined threshold value ±a and direction of the sprung mass velocity V is downward (−), the adjuster position is switched to the third position (② of FIG. 7 and position in FIG. 10) so that the compression stroke side, whose direction is the same as that of the present sprung mass velocity V, provides the high damping coefficient position in proportion to the sprung mass velocity −V and the extension stroke side, whose direction is the reverse to that of the sprung mass velocity V, provides the predetermined low damping coefficient (−$X_{soft}$).

Hence, in the preferred embodiment, the condition of the sprung mass is accurately grasped according to the acceleration signal value of the vertical G sensor from which the unsprung mass resonance frequency is eliminated. When the vibrations of the sprung mass velocity are not so violent, i.e., the stroke quantity of the shock absorber SA is not so excessive, one of the stroke sides whose direction is the same as that of the instantaneous sprung mass velocity ±V provides the high damping coefficient in proportion to the sprung mass velocity ±V so as to suppress the vibration of the sprung mass (vehicle body), thus improving a steering stability of the vehicle. At this time, the other stroke side whose direction is the reverse to that of the sprung mass velocity provides the predetermined low damping coefficient. Thus, the road surface input in the reverse direction to that of the stroke direction during vibration suppression control is absorbed so as to prevent the transmission of the road surface input to the vehicle body, thus improving a vehicular comfort.

B) Large input of road surface;

As denoted by e of FIGS. 13 (A) through 13 (E), when the absolute value |V| of the sprung mass velocity ±V is above the absolute value |a| of the predetermined threshold value ±a, the amplitude of extension/compression velocity becomes large. Therefore, the control constant of the damping coefficient is switched toward the high damping sensitivity side with the ±$X_{hard}$ position as the maximum limit of the damping coefficient. Consequently, a stronger damping force F exceeding the damping force at the ±$X_{hard}$ position is generated so that the increase in the sprung mass velocity V is suppressed.

Thereafter, at a time when the absolute value |V| of the sprung mass velocity ±V is reduced below the absolute value |b| of the threshold value ±b lower than the absolute value |a| of the predetermined threshold value ±a, the control constant is switched to the original normal damping sensitivity side.

As described above, since the control constant is switched to the control constant providing the high damping sensitivity, the extension/compression velocity and stroke of the shock absorber SA and stroke are suppressed so to prevent the stroke of the shock absorber SA from reaching the excessive extension limit.

Consequently, the stroke of the shock absorber SA at the time of excessive road surface input is suppressed and generations of the abnormal sound and vibration due to the reaching of the shock absorber stroke to the extension stroke limit can be prevented.

Although, in the preferred embodiment, the damping coefficient is proportionally controlled according to the sprung mass velocity, a predetermined threshold value may be provided for the sprung mass velocity and the damping coefficient may be changed with the predetermined threshold value as a boundary.

In addition, although the shock absorber such that when one of the extension and compression strokes is controlled toward the higher damping coefficient side, the other stroke is controlled toward the low damping coefficient is used in the preferred embodiment, such a shock absorber that both of the extension and compression stroke sides are controlled to the low damping coefficient side or high damping coefficient side may be used.

As described hereinabove, the shock absorber control system according to the present invention issues the control signal such that when the sprung mass velocity is below the predetermined threshold value, the stroke direction side of the shock absorber whose direction is the same as that of the sprung mass velocity is controlled toward the high damping coefficient side, and when the sprung mass velocity is increased and exceeds the predetermined threshold value, the control constant for the damping coefficient is changed toward the high damping sensitivity side until the sprung mass velocity is reduced below the other threshold value lower than the predetermined threshold value.

Therefore, since the stroke quantity of the shock absorber when the excessively large road surface input occurs is controlled so as to be changed toward the high damping coefficient side and suppressed, the generations of the abnormal sound and vibrations due to the reaching to the stroke extension limit can be prevented.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A suspension control system for an automotive vehicle, comprising:

a) at least one shock absorber, interposed between a sprung mass and an unsprung mass of the vehicle, having a piston member and a damping coefficient varying device disposed in the shock absorber, said damping coefficient varying device operatively changing positions in response to a control signal so that a damping coefficient of control signal so that a damping coefficient of either of an extension stroke side or a compression stroke side with respect to the piston member which is the same direction of the sprung mass movement is set to a target damping coefficient;

b) determining means, having at least one acceleration sensor disposed on a part of the sprung mass adjacent to said shock absorber, for detecting a vertical acceleration of the sprung mass and for determining a vertical velocity of the sprung mass on the basis of a signal indicative of the vertical acceleration derived from said acceleration sensor;

c) setting means for previously setting a first threshold value for the determined sprung mass velocity and a second threshold value therefor, said second threshold value having an absolute value which is lower than an absolute value of the first threshold value;

d) monitoring means for monitoring a change with respect to time of the determined sprung mass velocity indicative signal derived from said determining means with respect to the first and second threshold values; and e) controlling means for generating and outputting said control signal to said damping coefficient varying device based upon inputs received from said determining means, said setting means, and said monitoring means so that the damping coefficient at either one of the extension and compression stroke sides, wherein the direction of the piston member is the same as that of the determined sprung mass velocity, is set to a predetermined high damping coefficient as the target damping coefficient when an absolute value of the determined sprung mass velocity is below the absolute value of the first threshold value, said controlling means having a control constant changing block that changes said control signal for changing a control constant for the damping coefficient of the shock absorber toward a higher damping sensitivity range so as to prevent the piston member from reaching a maximum stroke limit until the absolute value of the sprung mass velocity is reduced below that of the second threshold value, when the absolute value of the sprung mass velocity is above the absolute value of the first threshold value.

2. A suspension control system for an automotive vehicle as set forth in claim 1, wherein said control constant changing block changes the control constant for the damping coefficient toward a normal damping sensitivity range when the absolute value of the sprung mass velocity is below the absolute value of the first threshold value and said control means thereafter calculates the target damping coefficient on the basis of the control constant providing the normal damping coefficient, said calculated target damping coefficient being proportional to the sprung mass velocity and predetermined relatively high damping coefficient ($+X_{hard}$), and being set as a maximum damping coefficient for either one of the stroke sides whose direction is the same as that of the sprung mass velocity.

3. A suspension control system for an automotive vehicle as set forth in claim 2, wherein said control constant changing block changes the control constant toward the higher damping sensitivity side when the absolute value of the sprung mass velocity is above the first threshold value and, thereafter, the determining means determines whether the absolute value of the sprung mass velocity is below the second threshold value.

4. A suspension control system for an automotive vehicle as set forth in claim 3, wherein said control means calculates the target damping coefficient on the basis of the control constant providing the higher damping sensitivity when the absolute value of the sprung mass velocity is above the first threshold value and/or when it is still above the second threshold value, said calculated damping coefficient is proportional to the absolute value of the sprung mass velocity with a predetermined highest damping coefficient ($X_{max}$) being set as the maximum damping coefficient for one of the stroke sides whose direction is the same as that of the sprung mass velocity.

5. A suspension control system for an automotive vehicle as set forth in claim 4, wherein when the predetermined highest damping coefficient ($+X_{max}$) is set as the maximum damping coefficient for the one stroke side whose direction is the same as that of the sprung mass velocity, a predetermined highest damping coefficient ($-X_{max}$) is set as the maximum damping coefficient for the other stroke side whose direction is the reverse to that of the sprung mass velocity.

6. A suspension control system for an automotive vehicle as set forth in claim 5, wherein when the direction of the sprung mass velocity is upward with respect to a vehicle body, the sprung mass velocity is expressed in terms of an absolute value of |V| and the direction thereof is denoted by + and when the direction of the sprung mass velocity is downward with respect to the vehicle body, the direction thereof is denoted by –.

7. A suspension control system for an automotive vehicle as set forth in claim 5, wherein said first threshold value is denoted by a, said second threshold value is denoted by b, the absolute value of the first and second threshold values are denoted by |a|, |b|, respectively.

8. A suspension control system for an automotive vehicle as set forth in claim 2, wherein when the relatively high damping coefficient ($+X_{hard}$) is set as the maximum damping coefficient for the one stroke side whose direction is the same as that of the sprung mass, a relatively high damping coefficient ($-X_{hard}$) is set as the maximum damping coefficient for the other stroke side whose direction is the reverse to that of the sprung mass velocity.

9. A suspension control system for an automotive vehicle as set forth in claim 1, wherein said determining means includes: a low pass filter having a cut-off frequency for passing only a sprung mass resonance frequency component as the vertical acceleration signal; and calculating means for calculating the absolute value and direction of the sprung mass velocity from the acceleration signal value passed through the low pass filter.

10. A suspension control system for an automotive vehicle as set forth in claim 9, wherein said cut-off frequency is approximately 3 Hz.

11. A suspension control method for an automotive vehicle, comprising the steps of:

a) detecting a vertical acceleration of a sprung mass of the vehicle from a vertical acceleration sensor disposed on a part of the vehicle body adjacent to a shock absorber so as to detect a vertical acceleration of the vehicle body;

b) determining a magnitude and direction of a vertical sprung mass velocity on the basis of a signal indicative of the vertical sprung mass acceleration from the acceleration sensor;

c) previously setting a first and second threshold value for the vertical sprung mass velocity, an absolute value of said first threshold value being higher than that of said second threshold value;

d) monitoring a change with respect to time of a signal indicative of the magnitude and direction of the vertical sprung mass velocity determined in said step b) with respect to the first and second threshold value;

e) producing a control signal to a damping coefficient varying device of said shock absorber based upon said magnitude and direction determined in step b), said first and second threshold values set in step c), and said changed monitored in step d) so that the damping coefficient at one of stroke sides whose direction of a piston member is the same as the direction of the monitored sprung mass vertical velocity signal is set to a predetermined high damping coefficient side when the absolute value of the determined vertical sprung mass velocity is below the first threshold value; and f) changing said control signal to a control constant for the damping coefficient setting toward a high damping sensitivity range until the absolute value of the sprung mass vertical velocity is reduced below that of the second threshold value, when the absolute value of the sprung mass vertical velocity exceeds that of the first threshold value.

* * * * *